United States Patent [19]

Hurt

[11] 3,837,455
[45] Sept. 24, 1974

[54] SYSTEM AND METHOD FOR CUSTOMER RETURN OF MERCHANDISE CARTS

[76] Inventor: Arthur J. Hurt, 720 S. Elizabeth St., Denver, Colo. 80209

[22] Filed: Oct. 10, 1972

[21] Appl. No.: 295,857

[52] U.S. Cl.......................... 194/4 R, 49/28, 49/35
[51] Int. Cl............................................. G07f 1/06
[58] Field of Search........... 194/4, 65; 49/26, 28, 35

[56] References Cited
UNITED STATES PATENTS

| | | | |
|---|---|---|---|
| 2,526,503 | 10/1950 | Raque................................ | 49/26 X |
| 3,194,377 | 7/1965 | Fishbach et al........................ | 194/4 |
| 3,220,528 | 11/1965 | Friedrich............................ | 194/65 X |
| 3,609,914 | 10/1971 | Berl................................ | 49/35 |

Primary Examiner—Robert B. Reeves
Assistant Examiner—Joseph J. Rolla
Attorney, Agent, or Firm—Ancel W. Lewis, Jr.

[57] ABSTRACT

In a merchandise cart return system and method to encourage the customer to return the merchandise cart to the store after use, there is provided a cart-receiving area normally blocked off by a partition including a movable door to control admittance of a cart into the cart receiving area and block the retraction of the cart from the area once it has been placed therein. The door is opened in response to the placement of the cart in front of the door and the presentation of a token given to the customer when a purchase is made. Once the cart is placed in the cart receiving area via the doorway, the door closes and a payoff device is actuated to pay out a reward for the return of the cart. To further position the cart, if desired, a turntable turns the carts so that the handle faces the direction of movement and a takeaway mechanism moves the cart from the turntable for subsequent pickup by the customers entering the store.

10 Claims, 13 Drawing Figures

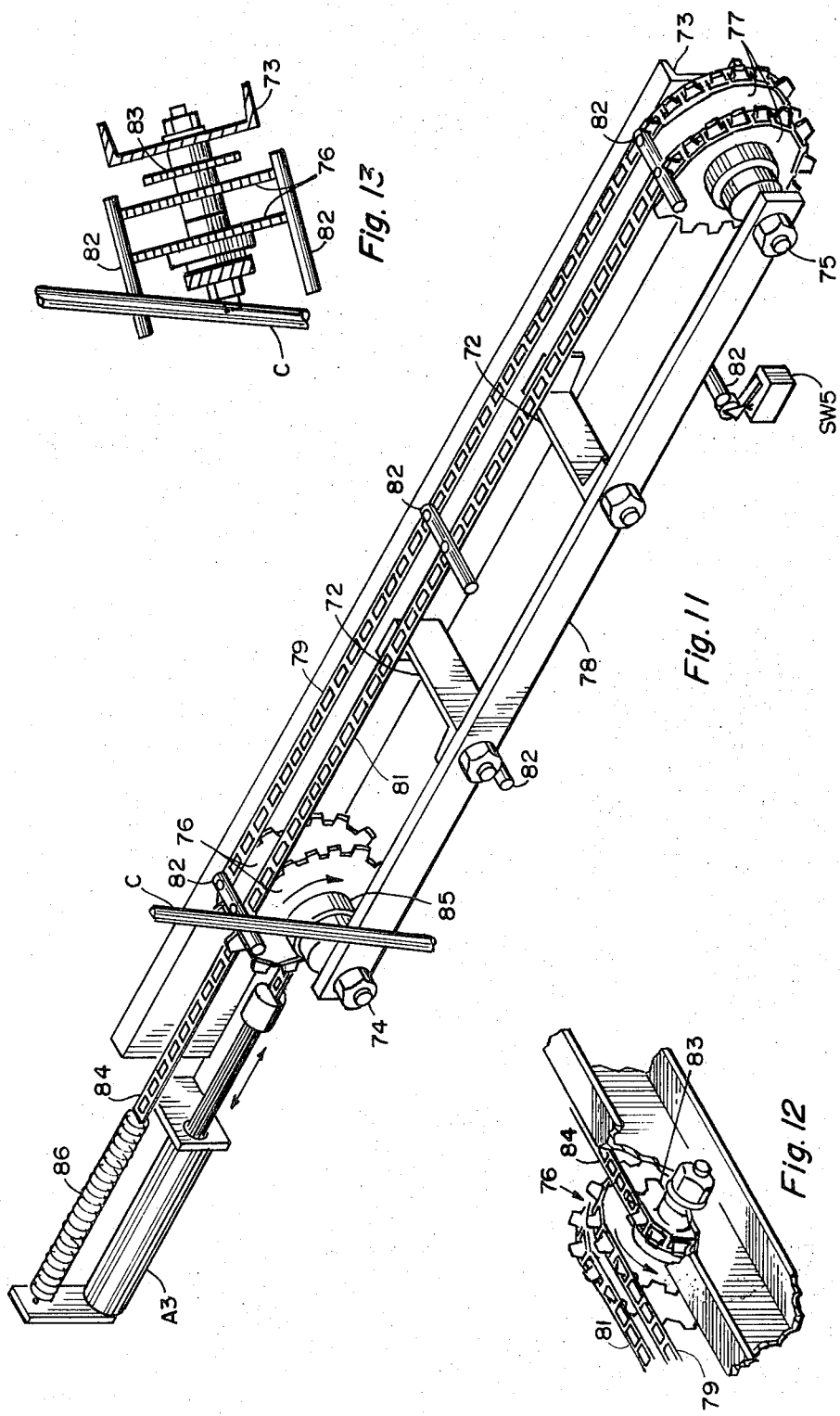

SYSTEM AND METHOD FOR CUSTOMER RETURN OF MERCHANDISE CARTS

This invention relates to store apparatus and methods and more particularly to a novel system and method to achieve the return of merchandise carts by the customer.

Present day merchandise stores such as supermarkets utilize merchandise carts to transport the merchandise before and after purchase. These carts usually become scattered throughout the parking lot surrounding the store and as a result, there are considerable costs involved to employ someone to collect the carts and return them to a selected location in the store usually adjacent the customer entrance. These carts are frequently taken from the parking lots or are sometimes damaged when struck by an automobile causing further losses. Some attempts have been made to return the carts to the store via an expensive underground transport system from a remote receiving station but employees are usually requested to do this since there is no incentive for the customer to return the carts.

Accordingly, it is a general object of the present invention to encourage customer participation in returning merchandise carts to a desired point in the store.

Another object of this invention is to provide a novel system and method which takes up a minimum of floor space within a store and wherein the customer will receive a reward for the return of the merchandise cart to a receiving area at a selected location in the store, usually adjacent the entrance of the store where the customer will enter and pickup an empty cart.

Still a further object of this invention is to provide a relatively simple method and system wherein there is provided a cart receiving area with partitioning means to control the admittance of carts into this area and to block the retraction of this cart into this area once it has been presented and further adapted to pay out a reward for returning the cart to the cart receiving area.

SUMMARY OF THE INVENTION

In accordance with the present invention in a preferred system and method herein described there is provided a cart receiving area preferably adjacent the customer entrance normally blocked off, such as with a wall of the building, with the wall having a doorway to pass the cart and a movable door to control the admittance of a cart via the doorway into the cart receiving area. The door opens in response to the placement of the cart in front of the door and insertion of a customer identification token into a slot at the entrance of the doorway. Once the cart is placed inside the doorway, the door closes and a payoff device releases a reward in the form of a coin, coupon or the like to the customer. In order to further position the returned cart, a turntable in the cart receiving area turns the returned cart so that the handle faces the direction of movement and a takeaway mechanism is, after the turn, actuated to move the cart off the turntable and in a direction to telescope in a group of returned carts at the customer entrance of the store. Further features include a closure for the token slot until the door opens and reopening of the door if an obstruction is in the doorway.

Other objects, advantages and capabilities of the present invention will become more apparent as the description preceeds taken in conjunction with the accompanying drawings, in which:

FIG. 11 is a perspective view of the takeaway mechanism shown in a non-tilted position for clarity;

FIG. 12 is a fragmentary perspective view of a fragment of the takeaway mechanism shown in FIG. 11;

FIG. 13 is an end elevation view of the takeaway mechanism in the normal titled position.

Figure 1:
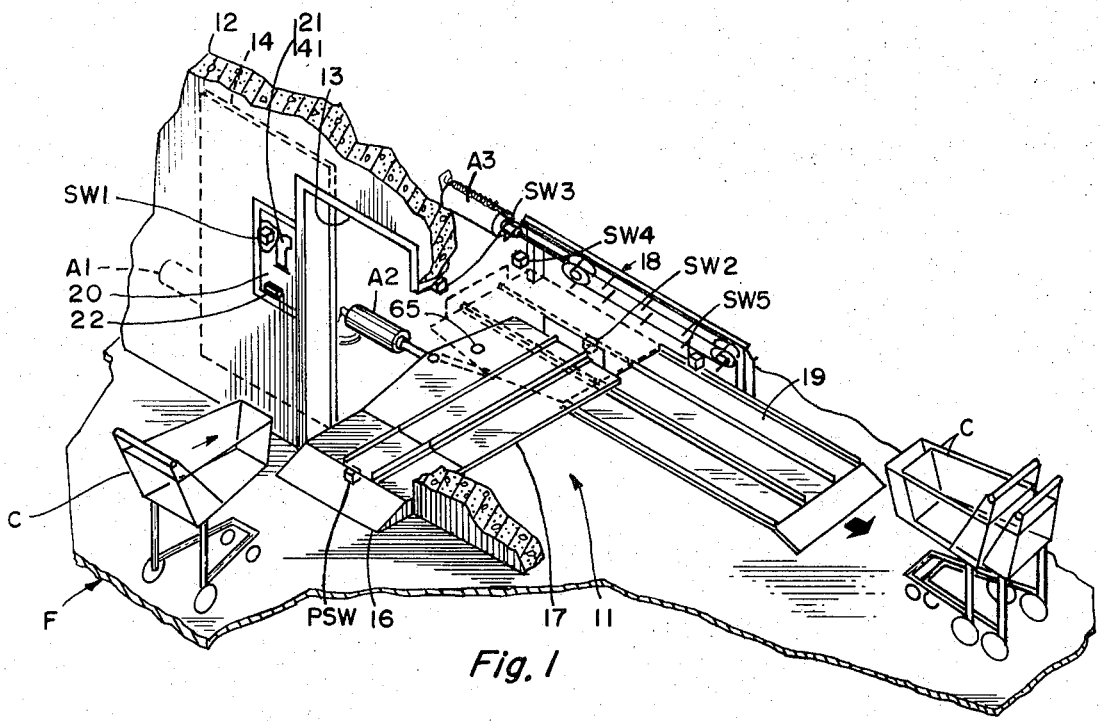
FIG. 1 is a fragmentary perspective view of a cart return system in a store embodying features of the present invention with portions broken away to show the general arrangement of various parts.

Referring now to 1 and 2 of the drawings, there is shown a fragmentary section of the main floor of a store represented at F having a cart receiving area designated 11 shown behind a partitioning wall 12 with a doorway 13 in the wall and a movable door 14 associated with the doorway adapted to move between an open and closed position to selectively open and close the doorway. Typically, the wall 12 may be the outside wall of the store adjacent the customer entrance and the cart receiving area 11 may be fenced off or otherwise partitioned to prevent access to children or the like from the store. Merchandising carts C are received on a receiving ramp 16 in the doorway 13 and are passed through the doorway 13 when the door is in the open position as described hereinafter and onto a turntable 17. A takeaway mechanism 18 is provided to move each cart from the turntable 17 onto a discharge ramp 19 with the handles of the carts C facing in the direction of movement so that they may be placed at a suitable location, preferably at the customer entrance of the store to be taken by the incoming customers. Adjacent the doorway and accessible on the outer or exposed side of the wall 12 opposite the cart receiving area is a token and coin box 20 recessed in the wall generally shown as having slot 21 for receiving a token and a coin trough 22 into which a coin is dispensed as a reward after the cart has been received in the cart receiving area 11.

The motive power for moving the various parts are in the form of an acutator A1 arranged to open and close the door 14, an actuator A2 which turns the turntable and an actuator A3 which moves the takeaway mechanism 18. Actuator A1 is a bidirectional in operation which moves in one direction to open a door and in the opposite direction to close the door. The actuators A1, A2 and A3 illustrated are electrically actuated, air-driven cylinder and piston assemblies. Each actuator is shown as having an air input line supplied by a suitable source of air pressure such as a compressor (not shown). Each input line has an air regulator and speed control valve to control the speed of movement of the piston rod. An air-operated system affords a smooth operation.

Figure 2:
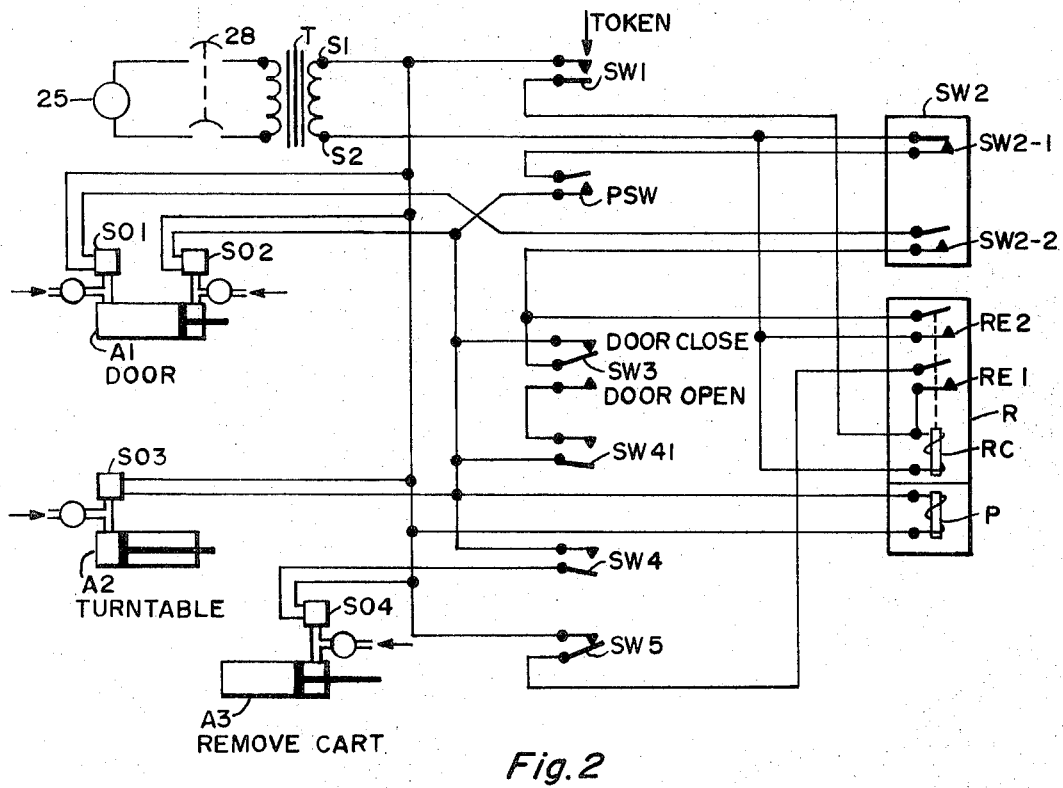
FIG. 2 is an electric circuit diagram for the system shown in FIG. 1.

Referring now to the circuit diagram in FIG. 2, there is shown electric power source represented at 25 which usually is line power applied through an overload circuit breaker 28 to the primary winding of a transformer T. The secondary winding of the transformer T has power terminals designated S1 and S2 which are herein referred to as power input terminals for supplying power from the power source 25 to power the control cicuits described hereinafter. The control circuits for the actuators will now be described with reference to the various sensing switches shown pictorially in FIG. 1 and connected to the power source schematically in FIG. 2.

A control circuit for the actuator A1 includes a normally-open proximity switch PSW positioned adjacent the entrance of the doorway and shown as under the receiving ramp 16 to sense the presence of the cart at the doorway. Switch PSW may be either magnetically sensitive to the metal in the cart or pressure sensitive to the weight of the cart and in either case is actuated when the cart is rolled up onto the receiving ramp 16. This control circuit connected between terminals S1 and S2 is a series circuit inclusive of the proximity switch PSW, the first normally closed contact SW2-1 of switch SW2 located at the back of the turntable and solenoid S02 of actuator A1 so that when the proximity switch PSW closes the solenoid S02 is actuated to move the piston rod in the cylinder in a direction to open the door.

A second control circuit connected between terminals S1 and S2 is a series circuit which includes a normally-open switch SW1 actuated by the insertion of a token in slot 21 and a coil RC of a relay R. The closure of the switch SW1 energizes the relay coil which closes sets of normally-open contacts RE1 and RE2 in the relay R. Relay contacts RE1 are a holding set of contacts and RE2 are a control set of contacts.

A third control circuit connected between terminals S1 and S2 is a series circuit which includes the set of normally-open control contacts RE2, a normally-open switch SW2—2 and solenoid S01 of actuator A1. Switch SW2—2 is closed by the positioning of the cart in the proper location on the turntable inside the doorway in the cart receiving area 11 causing solenoid S01 to be energized and the door 14 moves to the closed position.

A safety control circuit connected between terminals S1 and S2 is a series circuit including a safety switch SW41 located on the leading edge of the door 14, a single pole, double-throw door position switch SW3 located on the doorway adjacent the door with one side of the switch being closed by closure of the door, relay contacts RE2 and solenoid S02. In the event the door is moved toward the closed position and SW1 is engaged by an obstruction within the door, S02 is actuated to open the door. The pressure on the cylinder to open the door is greater than that to close the door so it will remain open until the obstruction is removed.

A fourth control circuit between terminals S1 and S2 is a series circuit which includes the door closed side of door switch SW3, contacts RE2, and solenoid S03 connected in parallel with payout coil P so that when SW3 is in the door closed position, the payoff coil is actuated and solenoid S03 is actuated so that actuator A2 turns the turntable and cart to swing through an arc of about ninety degrees.

A fifth control circuit between terminals S1 and S2 is a series circuit including a normally-open switch SW4, the door closed side of switch SW3, relay contact RE1 and solenoid S04 so that closure of switch SW4 which is located adjacent the takeaway ramp and actuated when the turntable reaches the end of the ninety degree turn actuates solenoid S04 causing actuator A3 to advance the cart from the turntable.

A sixth control circuit connected in series between terminals S1 and S2 includes a normally-closed switch SW5, tripped by the takeaway mechanism, holding contact RE1 and relay coil R whereby when the takeaway mechanism has moved to a full stroke SW5 is engaged and opened and the relay coil RC is de-energized. In this way contacts RE1 and RE2 open disabling the circuits connected therethrough and returns the circuit for the receipt of the next cart and token.

Figure 3:
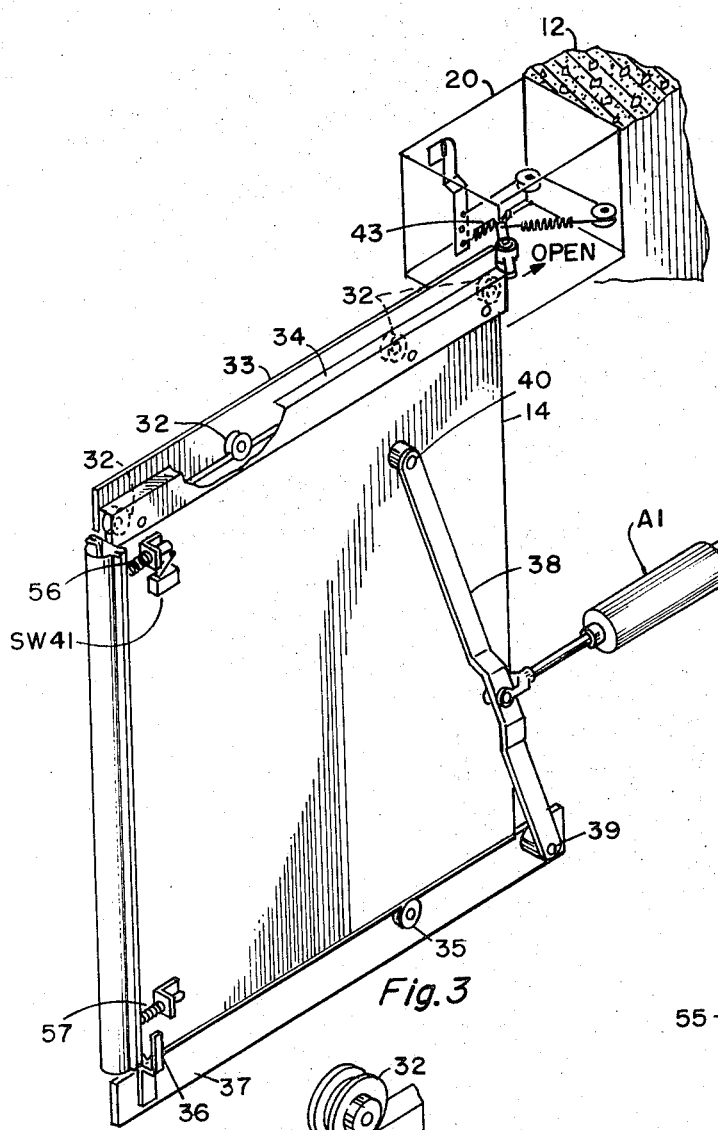
FIG. 3 is a perspective view of the door and the token and coin box operatively associated therewith.
Figure 4:
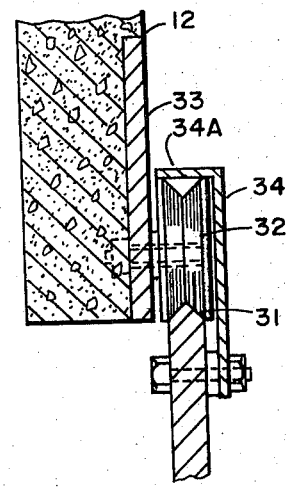
FIG. 4 is a fragmentary vertical sectional view showing the manner of suspension of the door.
Figure 7:
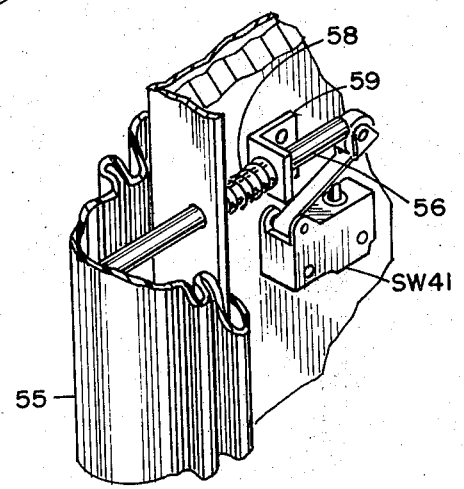
FIG. 7 is a fragmentary perspective view of the safety bumper on the door.
Figure 5:
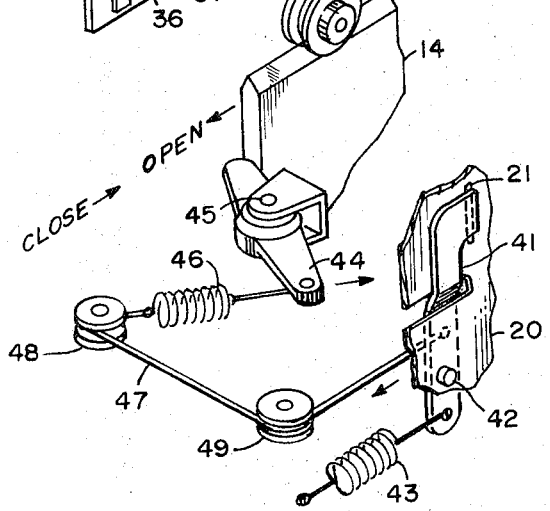
FIG. 5 is a fragmentary perspective view showing the safety switch arrangement for the door when an obstruction is present.
Figure 6:
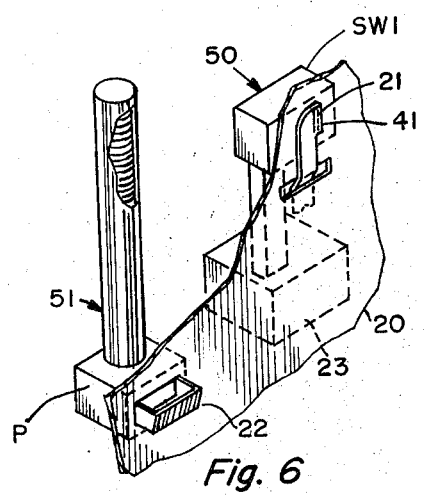
FIG. 6 is a perspective view of the coin and token box.
Figure 8:
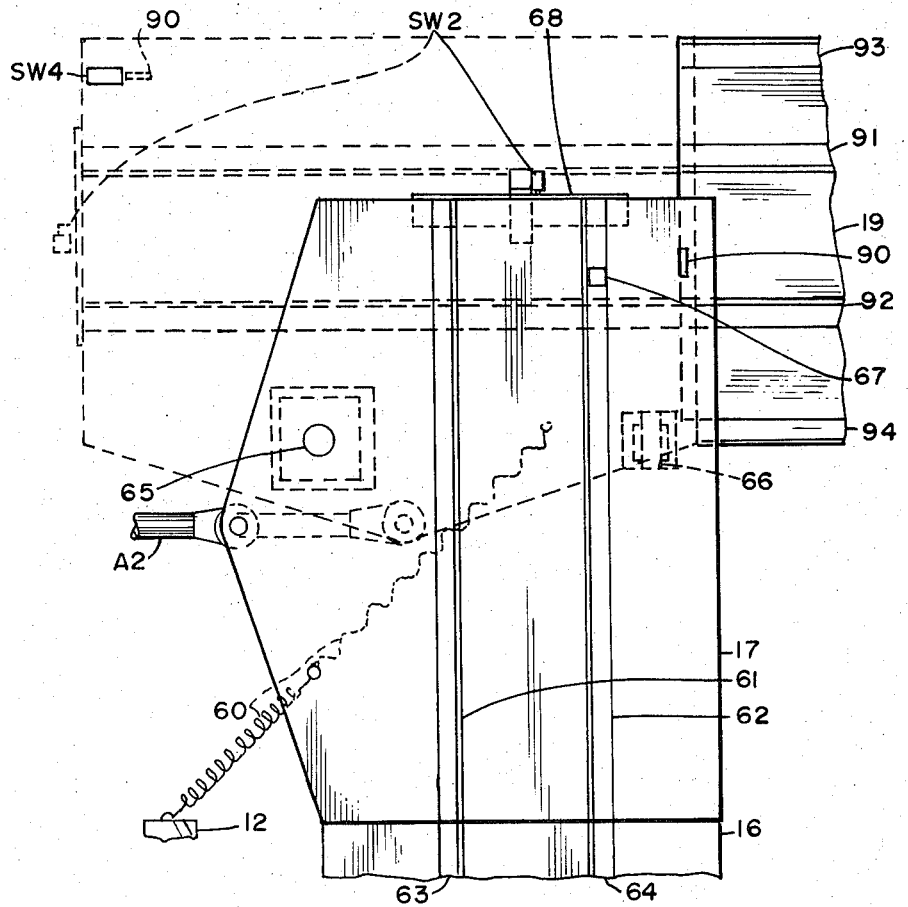
FIG. 8 is a top plan view showing the turntable in more detail.
Figure 9:
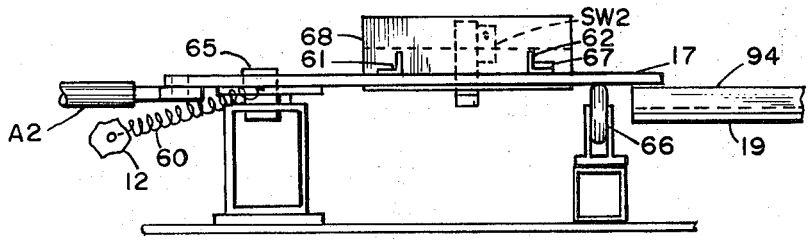
FIG. 9 is a side elevation view of the turntable.
Figure 10:
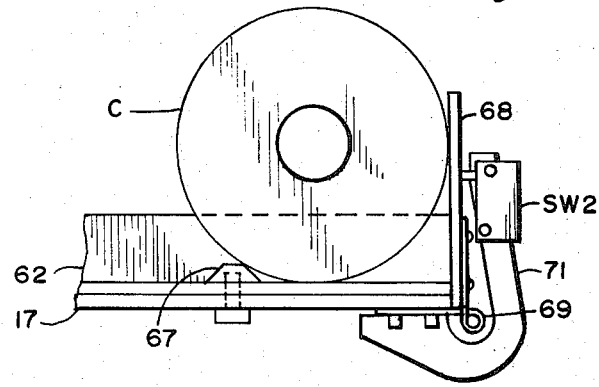
FIG. 10 is a fragmentary side elevation view showing a switch operatively associated with the turntable.

Referring now to FIGS. 3–5 the door 14 is shown as having an inverted V-shaped or beveled upper edge 31 which is fitted into a plurality of spaced pulleys 32 rotatably mounted for rotation on an overhead support 33. An inverted L-shaped hanger 34 extends up from a point of attachment to the outer side of the door and has an overhanging end portion 34A riding on the pulleys 32 to suspend the door on the pulleys. The lower end portion of the door slides on a pulley 35 and a guide 36 supported on a lower support 37. The piston rod of actuator A1 is coupled by a clevis to an intermediate portion of a swing lever 38 pivotally mounted at its lower end by pivot 39 to the lower support 37 and pivotally supported at its upper end by pivot 40 so that as the piston rod is drawn into the cylinder the door is moved toward the open position and as it is forced from the cylinder the door is moved toward the closed position.

In the coin and token box 20 a flag 41 is pivotally supported on a pivot 42 between its upper and lower ends and is normally biased by a spring 43 to cover the token slot 21. A lever 44 pivotally mounted on pivot 45 is tripped by the trailing edge of the door during the opening of the door via a linkage between one end of the lever 44 and a lower end of the flag. This linkage includes a spring 46 connected to the lever and a cable 47 reefed over a pair of pulleys, 48 and 49, the cable being attached to the bottom of the flag. Once the door is in the closed position the tension is off spring 46 allowing the return spring 43 to return the flag to the normal position closing off the slot.

The coin and token box 20 has a token unit 50 mounted on the inside thereof inclusive of a switch SW1 associated with token slot 21 which close in response to the receipt of a token and has a catch box 23 detachable from the switch for the removal of the tokens. A conventional token unit 50 SW1 suitable for the purpose above described is model No. 780-7 made by Coin Acceptors, Inc.

The coin return trough 20 has a coin payoff unit 51 feeding the trough 20 containing a payoff coil or solenoid P therein constructed and arranged to pay out a coin such as a dime each time coil P is energized as above described with reference to FIG. 2. A conventional coin payoff unit suitable for this purpose in model No. O.C.D. made by Advance Coin Acceptance Company.

The safety bar for the door includes a flexible bumper 55 along the leading edge normally disposed in an expanded position and engaged along the inside by upper and lower pins 56 and 57, each pin being biased outwardly against the bumper by a spring 58 held by a bracket 59 having an aperture through which the associated pin slides. In this way, the depression of the bumper as when an obstruction is in the doorway will cause switch SW41 to close.

The turntable 17 is in the form of a flat plate or platform with a pair of spaced, parallel angle iron guide rails 61 and 62 mounted thereon to provide a guide for the front wheels of the cart. Rails 61 and 62 align with a pair of guide rails on 63 and 64 on the receiving ramp 16. The turntable is mounted for rotation in a horizontal plane about a vertical axis established by a vertically disposed pivot rod 65 offset from a center line passing through the center of turntable. A support roller 66 is mounted under the platform in line with the pivot rod. The piston rod of actuator A2 is attached to one side of the platform on the center line of the platform and opposite the roller 66 so that as the rod is pushed from the cylinder the turntable will turn through an arc with its center at the pivot rod 65 and will move a full 90°. A return spring 60 is provided to return the turntable to the starting position for the loading of the next cart.

At the rear of the turntable there is provided on rail 62 a hump 67 over which the front cart wheel is rolled. The hump holds the cart against a rear upright wall 68 and moves it sufficiently far rearwardly to trip switch SW2. The rear wall 68 is supported at its lower end on a hinge 69 which allows the rear wall to swing rearwardly against the switch SW2. The switch is supported on a bracket 71 fastened to the underside of the turntable and extends around the back thereof. Switch SW4 is shown mounted under the turntable and is engaged by a trip 90 carried by the turntable when it reaches the end of the swing.

The takeaway mechanism 18 for the carts shown in more detail in FIGS. 11–13 comprises a generally horizontal channel-shaped support member 73 supported by a suitable upright structure and turned on its longitudinal axis to incline downwardly and inwardly toward the cart at an angle of about 15° as shown in FIGS. 1 and 13. The support member 73 supports a pair of spaced outwardly and downwardly extending shafts 74 and 75 for rotatably supporting axially spaced pairs of chain sprockets 76 and 77, respectively. A pair of support brackets 72 are welded to the support member 73 and are connected to an outer support rail B to further support the sprockets. The pairs of sprockets carry two parallel endless chains 79 and 81 which in turn have a plurality of pins 82 attached at spaced intervals to the chains. The distance between pins is sufficient to move the cart from the turntable. The drive for the sprockets include a chain sprocket 83 of smaller diameter than pairs of sprockets 76 and 77 on shaft 74 having a drive chain 84 reefed thereover.

A conventional slip clutch 85 like that found on a conventional rear bicycle wheel is arranged on shaft 74 between the smaller sprocket 83 and the larger pair of sprockets 76 so that rotation of sprocket 83 moves sprockets 76 in one direction but not in the other direction. A return spring 86 is attached to one end of the chain 84 and a clevis on the end of piston rod of actuator A3. The spring 85 extends the piston rod to rotate the smaller sprocket 84 in one direction without moving the larger sprocket due to the slip clutch 85. The actuation of the actuator A3 retracts the piston rod into the cylinder causing the rotation of the smaller sprocket 83 which in turn rotates the larger sprockets to move a pin 82 a sufficient distance along the chain to move the cart from the turntable on to the discharge ramp 19. At the end of the stroke one of the lower pins 82 engages the switch SW5. Once the stroke of the pin is ended the spring draws the piston rod back out of the cylinder of actuator 43. The axis of the chains are tilted at an angle of 15 degrees which allows the top pins to drive a leg of the cart while the bottom pins clear the cart.

The discharge ramp 19 has a pair of inside rails 91 and 92 parallel to one another to guide the front wheels of the cart and another to guide the rear wheels of the cart C. The intake end of the discharge ramp is shown as underlying the turntable.

OPERATION

For the full sequence of operation, with the door 14 closed and the cart C away from the doorway the proximity switch PSW is open. When the cart is in front of the door, switch PSW closes and current flows via SW2 to energize S02 to open door by actuating actuator A1. The cart is moved through doorway entrance and onto turntable 17, proximity switch PSW opens and switch contacts SW2—2 close and contacts SW2–1 open. The circuit is not ready for a customer recognition token.

The insertion of token into slot 21 closes contact SW1 causing energization of relay coil RC. Holding contact RE1 in series with coil RC and switch SW5 maintains relay contacts RE1 and RE2 closed. The closure of relay contact RE2 and positioning of cart at end of turntable causes switch SW2—2 to close to energize S01 to close the door. If an obstruction is in the doorway switch SW41 is closed and solenoid S02 is energized via switch SW3 in door open position to cause the door to open and the door will remain open until the obstruction is removed. The closure of door sets SW3 to the door closed position causing energization of payoff solenoid P and energization of S03 to cause A3 to turn cart 90°. When the turntable reaches 90°, SW4 is closed energizing solenoid S04 to move one pin a stroke and remove the cart from the turntable. Return spring 70 returns the turntable to receive the next cart. At the end of travel of the pin, the cart engages SW5 to open circuit energizing relay coil RC until token again closes SW1.

From the foregoing it should be apparent that in its simpliest form, the turntable and takeaway mechanisms and associated actuators are not essential. In other words a simpler system would only have the coin and token box or the equivalent and a control for the door whereby once the carts were received through the door the door would close and a coin or the like is dispensed.

It is apparent that the door 14 is only one form of partitioning or blocking means to close off the cart receiving area. For example, other forms of barriers or swing arms may be used. Moreover, it is understood that an electric rotary motor drive system would also be suitable to provide motive power for the door, turntable and takeaway mechanism and when electric rotary motors are used the blocking means may be a swing arm. The cart receiving area may be in the store or at a selected location outside the store.

The above described system and method will encourage customer return of carts with a minimum of effort and inducement by means of a reward. Further, the arrangement described affords safety to the customer and accessibility for maintenance.

Although the present invention has been described with a certain degree of particularity, it is understood that the present disclosure has been made by way of example and that changes in details of structure may be made without departing from the spirit thereof.

What is claimed is:

1. In a merchandise cart return system provided by the management of a store to encourage the return of merchandise carts, the combination comprising:
   a cart receiving area at a selected location;
   blocking means to normally block and control the admittance of a cart into the cart receiving area and block the retraction once it has been placed in the cart receiving area,
   identification means furnished by the management of the store for use each time a cart is presented operatively associated with the blocking means to control the actuation of the blocking means to admit the cart into the cart receiving area when the cart is presented;
   payout means responsive to the placement of the cart in the cart receiving area to pay out a reward to the identified party for returning the cart; and
   said cart receiving area having a turntable inside the doorway adapted to receive a cart and turn the cart through an angle of about 90°.

2. In a merchandise cart return system as set forth in claim 1 wherein said turntable includes a platform having an electrically actuated actuator adapted to turn the turntable about the pivot point upon the actuation thereof.

3. In a merchandise cart return system as set forth in claim 1 including means to remove the cart from the turntable and direct the cart with its handle facing forward in the direction of movement.

4. In a merchandise cart return system provided by the management of a store to encourage the return of merchandise carts, the combination comprising:
   a cart receiving area at a selected location;
   blocking means to normally block and control the admittance of a cart into the cart receiving area and block the retraction once it has been placed in the cart receiving area,
   identification means furnished by the management of the store for use each time a cart is presented operatively associated with the blocking means to control the actuation of the blocking means to admit the cart into the cart receiving area when the cart is presented;
   payout means responsive to the placement of the cart in the cart receiving area to pay out a reward to the identified party for returning the cart; and
   an actuator arranged to drive the door and sensing means adjacent the doorway to sense the presence of the cart at the doorway.

5. In a merchandise cart return system as set forth in claim 4 including safety means coupled to said actuator to prevent the closure of the door when an obstruction is present.

6. In a merchandise cart return system, the combination comprising:
   a cart receiving area at a selected location in the store;
   partitioning means to control the admittance of the cart into the cart receiving area and block the retraction of the cart once it has been placed in the cart receiving area including a wall with a doorway and a door movable between an open and closed position to selectively open and close the doorway;
   an actuator arranged to open and close the door;
   a control circuit means arranged for operative association with a source of electric power for selectively actuating said actuator including;
   a first control circuit operatively coupled to the actuator and character recognition means responsive to the presentation of a customer recognition device to cause the actuator to move to open the door to admit the cart into the cart receiving area; and
   a second control circuit operatively coupled to said actuator to close the door after the cart has been passed into the cart receiving area via the doorway and to actuate the payout means to pay out a reward to the customer for returning the cart to the cart receiving area.

7. In a merchandise cart return system as set forth in claim 6 wherein said customer recognition means is in the form of a token receiving unit and said customer recognition device is a token presented by the customer along with the cart.

8. In a merchandise cart return system as set forth in claim 6 wherein said proximity switch actuator is a bidirectional air cylinder operated by energization of electric solenoids.

9. In a merchandise car return system, the combination comprising:
   a cart receiving area having partitioning wall and a movable door in a doorway in the wall through which the cart will pass when the door is in the open position, said wall partitioning the cart receiving area off from access, said cart receiving area having a turntable adapted to rotate through an angle of about 90° and a takeaway mechanism to move a cart from the turntable after the cart has been turned;
   a token receiving unit adjacent the outer side of the wall opposite the receiving area with a slot for receiving a token for recognizing that the customer with the cart has made a purchase;
   a payoff box adjacent the outer side of the wall ox adjacent the outer side of the wall opposite the receiving area for dispensing a coin as a reward;
   a first actuator arranged to open and close the door;
   a second actuator arranged to turn the turntable through an angle of about 90°;
   a third actuator arranged to move the takeway mechanism;
   control circuit means including input terminals for selectively connecting said actuators to a source of electric power for the actuation thereof, said control circuit means including:

a first control circuit for the first actuator including a proximity switch connected to activate the first actuator when the cart is placed adjacent the entry of the doorway to open the door;

a second control circuit including a first switch responsive to a token inserted in the token box and a coil of a relay actuated by the actuation of first switch, said relay having a set of holding contacts and set of control contacts;

a third control circuit including said set control contacts and a second switch actuated by the positioning of a cart on the turntable inside the doorway to actuate said first actuator to close the door after the token has been inserted;

a safety control circuit including a safety switch actuated when an obstruction engages the door in the doorway connected to actuate said first actuator to open the door until the obstruction is removed;

a fourth control circuit including a third switch actuated by the closure of the door connected to cause the actuation of the payoff unit and cause the actuation of the second actuator to turn the turntable end cart through an arc of about 90°;

a fifth control circuit including a fourth switch actuated when the turntable reaches the end of its turn to actuate the takeaway mechanism to remove the cart from the turntable;

a sixth control circuit including a fifth switch association with said set of holding contacts in the relay and actuated when the cart is removed from the turntable to open the circuit energizing the relay coil to disable the circuits connected through said relay contacts and return the circuit for receipt of the next cart and token.

10. In a method for the management of a store to encourage identified parties including customers to return merchandise carts to a selected location in a store; the steps of:

providing a cart receiving area at a selected location, normally blocking the cart from admittance to the cart receiving area, admitting the cart into the cart receiving area upon the presentation of a party identification means and a cart, blocking the retraction of the cart from the cart receiving area once it has been admitted, paying out a reward to the identified party for returning the cart to the cart receiving area and turning the cart in the cart receiving area through an arch of about 90° and advancing the turned cart handle first into a stack of similar carts.

* * * * *